Figure 1:
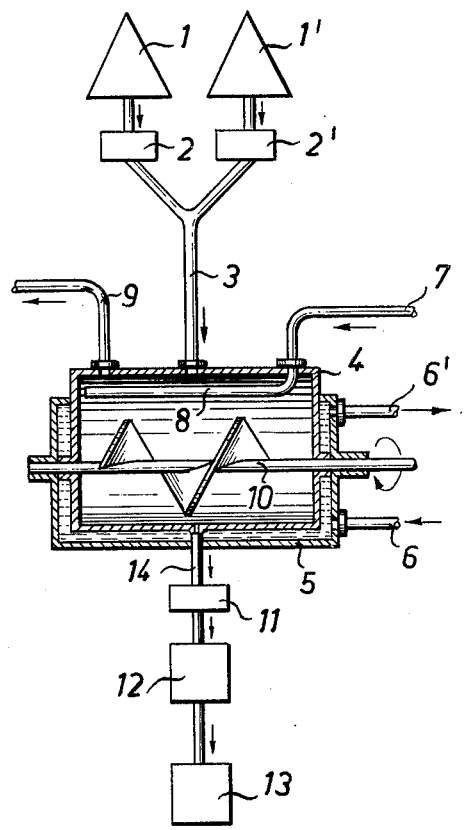

United States Patent [19]

Schrödter et al.

[11] 3,978,195

[45] Aug. 31, 1976

[54] PROCESS FOR THE PRODUCTION OF SUBSTANTIALLY WATER-INSOLUBLE LINEAR AMMONIUM POLYPHOSPHATES

[75] Inventors: Hermann Schrödter, Erftstadt Bliesheim; Hans-Werner Stephan, Cologne-Klettenberg; Gero Heymer, Erftstadt Liblar, all of Germany

[73] Assignee: Hoechst Aktiengesellschaft, Frankfurt am Main, Germany

[22] Filed: June 3, 1974

[21] Appl. No.: 475,820

[30] Foreign Application Priority Data

June 14, 1973 Germany............................ 2330174

[52] U.S. Cl..................................... 423/305; 71/43; 423/312
[51] Int. Cl.² ..................... C01B 15/16; C01B 25/26
[58] Field of Search .................... 423/305, 308–313; 71/43

[56] References Cited
UNITED STATES PATENTS 3,503,706   3/1970   Legal ...................................... 71/43
3,653,821   4/1972   Heymer et al. ...................... 423/305

*Primary Examiner*—Earl C. Thomas
*Assistant Examiner*—Gregory A. Heller
*Attorney, Agent, or Firm*—Connolly and Hutz

[57] ABSTRACT

Production of substantially water-insoluble linear ammonium polyphosphates of the general formula $(NH_4PO_3)_n$, in which $n$ is a number between 10 and 1000. To this end, substantially equimolecular proportions of ammonium orthophosphate and phosphorus pentoxide are reacted by heating them to temperatures within the range 170° and 350°C in the presence of gaseous ammonia. The reaction is effected while continuously and simultaneously mixing, kneading and comminuting the reaction material in a reactor. The reactor is closed, provided with means for the supply of solid feed material, a gas inlet and a gas outlet, a discharge opening for the removal of final product, and with mixing, kneading and comminuting implements which are rotatably secured to the inside of the reactor.

1 Claim, 3 Drawing Figures

PROCESS FOR THE PRODUCTION OF SUBSTANTIALLY WATER-INSOLUBLE LINEAR AMMONIUM POLYPHOSPHATES

The present invention relates to a process for making substantially water-insoluble linear ammonium polyphosphates of the general formula $(NH_4PO_3)_n$, in which $n$ stands for a whole number within the range 10 and 1000, by heating substantially equimolecular proportions of ammonium orthophosphate and phosphorus pentoxide to temperatures within the range 170° and 350°C in the presence of gaseous ammonia.

Ammonium polyphosphates, formerly termed ammonium metaphosphates, have long been known. Subjecting orthophosphates to thermal dehydration has been the route initially tried for the production of condensed ammonium phosphates, in a manner analogous to the corresponding alkali metal and alkaline earth metal salts. With respect to the dehydration, it has, however, been necessary for it to be carried out at temperatures which cause high rises in pressure which in turn cause the escape of considerable proportions of $NH_3$, and undesirable, cross-linked ultraphosphates are obtained.

The preparation in the laboratory of ammonium polyphosphates - briefly termed APP hereinafter - has been further investigated during the last decades and processes have been developed which avoid the adverse effects referred to hereinabove. All these processes are based on the reaction of phosphate-containing substances with a condensing agent and an ammonizing agent under ammonia and at elevated temperature.

German Pat. No. 742 256, for example, describes a process, wherein ammonium orthophosphate placed in an autoclave is treated with phosphorus pentoxide and ammonia under pressure at temperatures higher than 200°C. To reduce the proportion of the water-soluble component in the resulting product, it is necessary for the latter to be comminuted and heat-treated once again.

German Patent Specification "Auslegeschrift" 1,216,836 and German Patent Specification "Offenlegungsschrift" 1,442,995 describe processes, wherein the orthophosphates are freed from the water of constitution present therein by reacting them with urea and/or similar material, such as melamine, thiourea or dicyanodiamide. These processes are, however, not very suitable for use on an industrial scale in view of the fact that considerable quantities of gases ($CO_2$ and $NH_3$) originating from the reaction have to be expelled from the reaction mixture which is soft at reaction temperature. One mole of urea producing 1 Mol of $CO_2$ and 2 mols of $NH_3$, is more particularly needed for the combination of every two $PO_4$-groups so as to have a P-O-P bond in the chain. Depending on the nature of the phosphate-containing substance used, up to 1 mol of $NH_3$ is bound as a cation in APP. In other words, between 2 and 3 mols of gas is evolved upon the condensation of 1 mol of orthophosphate to long-chain material. This corresponds to a quantity of gas approaching 1 cubic meter per kg of APP, for a mean reaction temperature of 250°C. Upon the escape of that large quantity of gas, the soft reaction mass undergoes a considerable increase in volume. Adverse effects of this reside in considerable difficulties with respect to equipment, in poor space/time-yields and in the fact that the process is rendered considerably more costly.

In addition to this, the large quantities of $NH_3$ and $CO_2$ which escape react with one another within the cooler parts of the apparatus, which becomes encrusted with, and clogged by, the resulting solid compounds.

Attempts have been made to reduce the difficulties pertaining to equipment, chiefly by multi-stage operation, such as that disclosed in German Patent Specification "Auslegeschrift" No. 1 567 692, comprising preparing a melt of orthophoshoric acid and urea, spraying the melt on to a circulated bed of hot return material, which is a heat carrier, and, in a third step, introducing the bed into an indirectly heated calcination chamber for complete condensation therein.

One further method of carrying out the process described in this latter German Patent Specification comprises converting the reaction partners to a melt, admixing the melt thus obtained with an identical quantity of return material, heating the whole until $CO_2$ and $NH_3$ cease to be evolved, and then terminating the reaction by increasing the temperature to 275°C.

A still further process has been described in German Patent Specification "Auslegeschrift" 1 767 205, wherein ammonium polyphosphates are produced from ammonium orthophosphates, phosphorus pentoxide and, if desired, urea in the presence of ammonia, in a tunnel kiln or rotary kiln. An adverse effect of this process resides in the complication that it is necessary for the starting materials to be intimately mixed together and, as it would appear to result from the drawings attached to that Patent Specification, for the reactors to be operated at certain temperature gradients.

In accordance with the present invention, we now unexpectedly provide a process for making substantially water-insoluble, linear ammonium polyphosphates of the general formula $(NH_4PO_3)_n$, wherein $n$ stands for a whole number within the approximate range 10 and 1000 by reacting substantially equimolecular proportions of ammonium orthophosphate and phosphorus pentoxide in the presence of gaseous ammonia by heating them to temperatures within the range 170° and 350°C, which process is free from the disadvantages referred to hereinabove and which comprises carrying out the reaction while continuously and simultaneously mixing, kneading and comminuting the material to undergo reaction.

During the first reaction phase, where the reaction mixture has a pasty consistency, it should preferably be mixed, kneaded and comminuted, at a relatively low speed and during the second reaction phase it should preferably be mixed, kneaded and comminuted at high speed whereby the reaction product is transformed to some sort of fluidized material. By establishing a certain reaction temperature, it is possible to predetermine the water-insolubility of the resulting final product, the water insolubility increasing with an increasing reaction temperature.

Final products having a solubility of 22 % or 13 % or 9 % or 6 % or between 2 and 3 % are obtained at temperatures of 200°C, 210°C, 230°C, 250°C and 270°C, respectively, the intermediate solubility values lying within the region of a curve obtained on plotting the above values graphically.

One first advantage in which the present process compares favorably with the prior art methods resides in the fact that it is unnecessary to prepare a mixture of the ammonium orthophosphate and phosphorus pentoxide starting materials for reaction in the apparatus to APP. It is equally unnecessary to comminute the ammonium phosphates, which are known to form hard lumps difficult to comminute, after storage for some prolonged time.

A second advantage resides in the fact that the reaction is carried out in a single reactor, provided with a heating jacket, wherein the temperature selected is maintained constant over the entire reaction period, for making a product of predetermined properties. In other words, the present process avoids multi-stage operation in a plurality of reactors adjusted to different temperatures, and avoids the need to establish temperature gradients in a tunnel or rotary kiln.

A third advantage resides in the fact that the present process provides for $NH_3$ to be uniformly distributed across the surface of the material to undergo reaction by means of a simple gas-distributing means, for example by means of a perforated tube, where it reacts with the other reaction components in accordance with the following empirical reaction equation:

$$(NH_4)_2HPO_4 + \tfrac{1}{2}P_4O_{10} + NH_3 = \tfrac{3}{n}(NH_4PO_3)_n$$

This is an extremely rapid reaction as kneading continually produces fresh surfaces in contact with which the $NH_3$ undergoes reaction. As a result, the contact times are substantially shorter than those indicated, for example, for the prior process described in German Patent No. 742 256, wherein it is necessary for the relatively water-soluble material coming from a first reaction step to be finely comminuted and to be heat-treated a second time.

A fourth advantage of the present process resides in the fact that only excess $NH_3$ must substantially be eliminated from the reactor, without any need to remove large quantities of other gases, such as $CO_2$. In other words, the process of the present invention does not call for the use of equipment for maintaining a certain minimum partial pressure, such as equipment used in the processes described in German Patent Specification "Offenlegungsschrift" 1 567 698 or in German Patent Specification "Auslegeschrift" 1 767 205, wherein gas in excess and gas evolved have to be exhausted near the ends of the reactors.

In addition to this, the present process avoids the need to use equipment such as otherwise necessary for the work-up of the considerable quantities of ammonia and carbon dioxide, or for the treatment of their secondary products.

A fifth advantage of the present invention resides in the fact that it provides for the solubility of the final product to be predetermined by the selection of an appropriate reaction temperature.

In other words, the present process enables the proportion of soluble matter in the final product to be predetermined. Only slight modification is necessary to provide for the manufacture, in one and the same apparatus, of products of different solubility and different properties for different uses.

Yet another advantage of the present process resides in the fact that the resulting final product is fine particulate material well adapted for use in widespread fields, e.g. for use as a flame-retardant agent in polyurethane foam plastics or intumescent paints, without the need to grind it. A simple sieve or screen is all that is necessary to separate fine particulate material from minor proportions of oversize particles, the latter being returned to the reactor.

The process of the present invention will now be described with reference to the accompanying drawing of which FIG. 1 is an exemplary embodiment of an apparatus for carrying out the process.

As can be seen, the ammonium phosphate and phosphorus pentoxide starting materials coming from reservoirs 1 and 1', respectively, are delivered via weighing means 2 and 2' and through a conduit 3 to a reactor 4. The latter preferably comprises a closed trough provided with a heating jacket, wherein a heating medium is kept under circulation, and with an inlet 6 and an outlet 6'.

During the entire reaction period, ammonia is introduced into reactor 4 by means of a gas supply tube 7 and uniformly distributed across the surface of the reaction mass in reactor 7 by means of a gas distributing instrument, which preferably is a tube provided with a plurality of small perforations. Ammonia in excess escapes from reactor 4 through a gas outlet 9 and is absorbed in a separate device (not shown in the drawing).

Implements 10 which are rotatably secured to a horizontal shaft mix, knead and comminute the reaction material. After completion of the reaction, the reaction product is delivered through an outlet 14 and a cooling means 11 to a sieving or screening mechanism 12 and separated into fine particulate material and oversize material, respectively. The fine-particulate material is packed in a filling stion 13 and oversize material is returned to reactor 4. It is naturally also possible to grind the whole final product or the relatively coarse oversize material, after sieving.

The mixing, kneading and comminuting implements, which normally comprise two double Z-shaped blades rotating at variable speed around two horizontal shafts parallel with respect to one another, should more preferably be arranged in such a manner that it is possible for the reaction mass to be moved horizontally towards the center of the reaction zone, away from the shaft bearings secured to the walls of the reactor. This means considerably reduced mechanical stress for the shaft bearings and stuffing boxes.

In accordance with the present invention, it is also possible for the shafts to be arranged in inclined or upright position.

Figure 2:
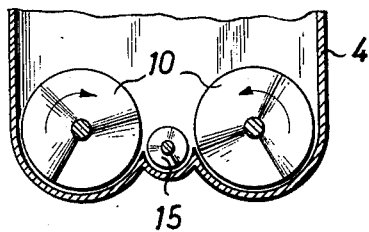
Figure 3:
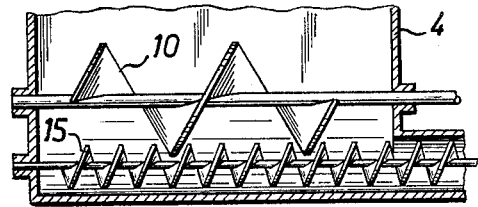

A further preferred form of apparatus is shown in FIGS. 2 and 3, wherein a screw conveyor 15 conveying material during the reaction towards and into the trough, is interposed between the implements 10, whereby the product particles are subject to increased friction and comminuted more rapidly. By reversing the direction of drive, it is possible to use the screw conveyor 15 as a discharge means.

The speed of rotation of the mixing, kneading and comminuting implements is variable and makes it possible for the reaction material to be very efficiently mixed, kneaded and comminuted. More particularly, during those reaction phases during which the reaction mixture is hard and lumpy or pasty, where considerable mechanical forces have to be outweighed, the implements should preferably be caused to rotate at low speed and, after comminution has been achieved, they should be caused to rotate at higher speed, whereby the reaction mixture is transformed to some sort of a fluidized material. This results in an increased exchange of material and heat and in shortened reaction periods.

The speed of rotation is varied in accordance with power absorption. The following Examples further illustrate the present invention.

EXAMPLE 1

A 7 liter reactor heated to 265°C and provided with mixing, kneading and comminuting implements rotatably secured thereto was used. The reactor was fed with an intimate mixture of 2 640 g of fine-particulate $(NH_4)_2HPO_4$ and 2840 g of fine-particulate $P_4O_{10}$. 400 l of $NH_3$ was introduced thereinto within 1 hour and the whole was mixed thereafter with 100 l/hr of $NH_3$. After 2 hours, a crystalline product was obtained containing $NH_3$ and P in a molar ratio of 0.986:1 and 3.6 % of water-soluble matter (1 % suspension in water at 25°C). The suspension had a pH-value of 5.2. It contained 99.7 % of nitrogen, in the form of $NH_3$.

EXAMPLE 2

A 7 liter reactor heated to 265°C and provided with mixing, kneading and comminuting implements rotatably secured thereto was used. 2 640 g of $(NH_4)_2HPO_4$ (fist size material) and 2 840 g of coarse $P_4O_{10}$ were introduced successively into the reactor. 400 l of $NH_3$ was introduced within 1 hour and the whole was mixed thereafter with 200 l/hr of $NH_3$. After 2 hours, a crystalline product containing $NH_3$ and P in a molar ratio of 0.99:1 and 1.9 % of water-soluble matter (1 % suspension in water at 25°C) was obtained. The suspension had a pH value of 5.3. It contained 99.4 % of nitrogen, in the form of $NH_3$.

EXAMPLE 3

A 7 liter reactor heated to 265°C and provided with mixing, kneading and comminuting implements rotatably secured thereto was used. 2 301 g of $NH_4H_2PO_4$ (fist size material) and 2 840 g of $P_4O_{10}$ were introduced successively into the reactor. 800 l of $NH_3$ was introduced within 1 hour and the whole was mixed thereafter with 200 l/h of $NH_3$. After 2 hours, a crystalline product containing $NH_3$ and P in a molar ratio of 0.99:1 and 2.1 % of soluble matter (1 % suspension in water at 25°C) was obtained. The suspension had a pH value of 5.3. It contained 99.6 % of nitrogen, in the form of $NH_3$.

EXAMPLE 4

Diammonium phosphate and phosphorus pentoxide were reacted in the manner described in Example 2 and the resulting reaction products were removed from the reaction zone after 2 hours. The solubility data of the individual reaction products, which were a function of the reaction temperature selected, are indicated in the following Table:

| Reaction temperature (°C) | Solubility % |
| --- | --- |
| 200 | 20 |
| 210 | 13 |
| 230 | 9 |
| 250 | 6 |
| 270 | 2–3 |

EXAMPLE 5

A 70 liter reactor heated to 270°C and provided with two mixing, kneading and comminuting implements rotatably secured thereto was supplied with 26.4 kg of $(NH_4)_2HPO_4$ (fist size material) and 28.4 kg of $P_4O_{10}$ which were successively introduced thereinto. Interposed between the two implements was a screw conveyor. 3.5 cubic meters/h of $NH_3$ was introduced into the reactor within the first 2 hours.

The properties of the final products obtained, which were a function of the contact times selected in each particular case, are indicated in the following Table:

| Contact time (h) | Molar ratio of $NH_3$:P in final product | Wgt % of $N_2$ bound in the form of $NH_3$ | Solubility (%) | pH | Particle size (%) 63 μm |
| --- | --- | --- | --- | --- | --- |
| 1 | 1.02:1 | 98 | 1.34 | 5.1 | 94.2 |
| 2 | 1.01:1 | 99.3 | 1.12 | 5.3 | 94.5 |
| 3 | 1.01:1 | 100 | 0.67 | 5.3 | 98 |

The same reaction was carried out in a similar device except that the rotatable screw between the implements was omitted. In order to obtain the same proportion of fine-particulate material, it was necessary to prolong the contact times by 1 to 2 hours.

EXAMPLE 6

A 70 liter reactor heated to 260°C and provided with mixing, kneading and comminuting implements rotatably secured thereto was supplied with 26 kg of $(NH_4)_2HPO_4$ (fist size material) and 28.4 kg of $P_4O_{10}$, which were successively introduced thereinto. 4 cubic meters of $NH_3$ was introduced into the reactor within 1 hour which was thereafter supplied with 1.5 cubic meter/h of $NH_3$. The speed of the rotating mixing, kneading and comminuting implements was varied in two stages, in accordance with the power absorbed. The implements were caused to rotate at low speed (15 and 21 rpm/min) as long as the reaction material was pasty or contained hard lumps. As soon as the reaction material was found to have been substantially comminuted and power absorption descreased, the implements were automatically caused to rotate at higher speed (49 and 64 rpm, respectively). After 2 hours, a product containing $NH_3$ and P in a molar ratio of 0.985:1 and 1.5 % of water soluble matter was obtained. A suspension thereof had a pH value of 5.40. The product contained 99.3 % of nitrogen, in the form of $NH_3$.

The same apparatus was used and operated under identical reaction conditions save that the mixing, kneading and comminuting implements were caused to rotate at low speed during the entire reaction time. After 2 hours, a product containing 3.8 % of water-soluble matter was obtained. The $NH_3$:P molar ratio was 0.98:1 and the suspension had a pH-value of 5.20. The product contained 99.1 % of nitrogen, in the form of $NH_3$.

We claim:
1. The process for making substantially water-insoluble linear ammonium polyphosphates of the general formula $(NH_4PO_3)_n$, in which $n$ stands for a number between 10 and 1000, comprising the steps of reacting starting material consisting essentially of substantially equimolecular proportions of ammonium orthophosphate and phosphorus pentoxide in the presence of gaseous ammonia by heating them to temperatures between about 180° and 350°C, the starting phosphate material being of a fist size which forms a resulting hard and lumpy reaction mixture, mixing, kneading and comminuting the starting material at suitable relatively low speeds for the period necessary for the hard and lumpy reaction mixture to pass via a state of pasty consistency to a state of fine-particulate material and mixing, kneading and comminuting the fine-particulate material at a suitable relatively higher speed than applied to the hard and lumpy mixture, with the resultant formation of a quasi fluidized ammonium polyphosphate material having a relatively low water solubility of from about 2 % to about 22 % with the water insolubility increasing with increase in reaction temperature, the relatively lower speeds ranging from about 15 to 21 rpm, and the relatively higher speeds ranging from about 49 to 64 rpm.

\* \* \* \* \*